United States Patent [19]

Emmer

[11] Patent Number: 4,712,941
[45] Date of Patent: Dec. 15, 1987

[54] TAPERED PISTON PIN
[75] Inventor: Eric D. Emmer, Troy, Mich.
[73] Assignee: Chrysler Motors Corporation, Highland Park, Mich.
[21] Appl. No.: 937,243
[22] Filed: Dec. 3, 1986

Related U.S. Application Data

[62] Division of Ser. No. 808,968, Dec. 16, 1985.
[51] Int. Cl.[4] .............................................. F16C 11/06
[52] U.S. Cl. ................................ 403/151; 403/161; 74/579 E
[58] Field of Search ............... 403/150, 151, 152, 161, 403/162; 74/579 E; 92/187; 29/156.5 A

[56] References Cited

U.S. PATENT DOCUMENTS

| | | | |
|---|---|---|---|
| 1,112,737 | 10/1914 | Vogt | 29/156.5 A |
| 2,428,602 | 10/1947 | Yingling | 74/579 E |
| 4,359,913 | 11/1982 | Mahlke | 403/150 X |
| 4,461,595 | 7/1984 | Mallas | 74/579 E X |

FOREIGN PATENT DOCUMENTS 2615212 10/1977 Fed. Rep. of Germany ........ 92/187

Primary Examiner—Andrew V. Kundrat
Attorney, Agent, or Firm—Kenneth H. MacLean, Jr.

[57] ABSTRACT

A tubular piston pin for an internal combustion engine being of lightweight and high strength design with a cylindrical exterior surface and a double hourglass shaped aperture defined by thin-walled end portions; a thin-walled intermediate portion and two thicker-walled portions therebetween. A method for easy and inexpensive piston pin manufacture includes: the formation of half pins by molding a metal slug between two dies each having tapered end portions, punching out a midportion or intermediate web or wall to form an aperture therethrough with a generally hourglass shape, and aligning and joining two half pins axially together to form a piston pin with the double hourglass shaped interior aperture.

1 Claim, 7 Drawing Figures

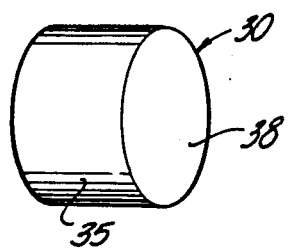
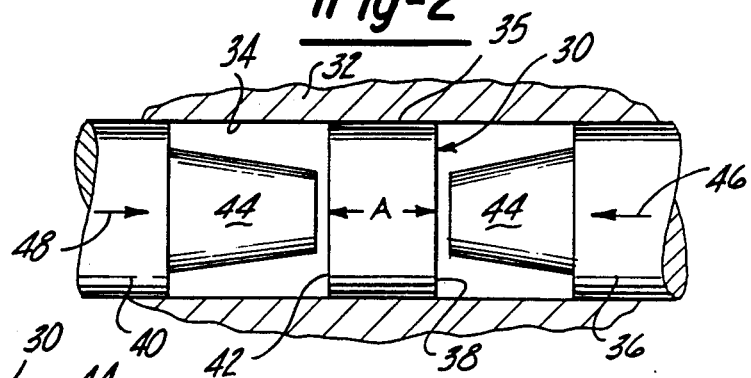
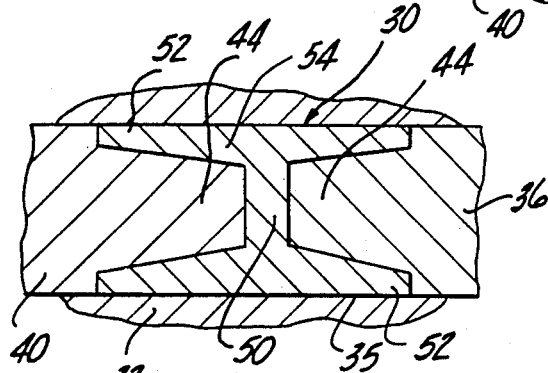
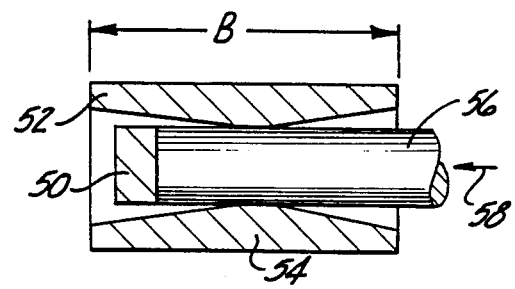
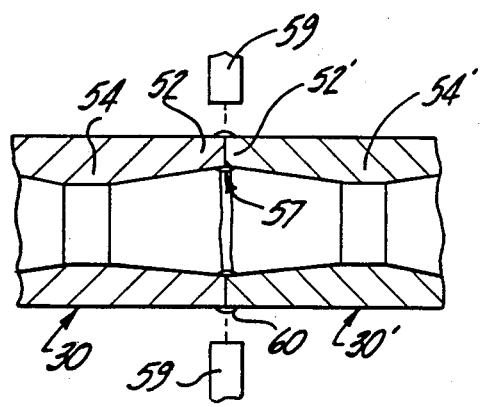
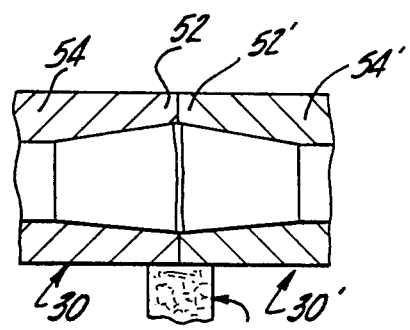
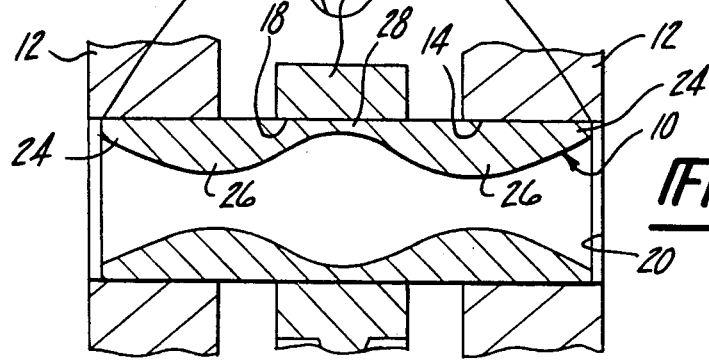

TAPERED PISTON PIN

This is a division of application Ser. No. 808,968 filed on Dec. 16, 1985.

BACKGROUND OF THE INVENTION

1. This application discloses a light-weight yet high strength piston pin for internal combustion engines and a method or process for manufacturing the piston pin. The pin is tubular with a normal cylindrical exterior surface, but has a double hourglass shaped aperture axially extending therethrough. This results in relatively thin walls near the pin's end portion and its midpoint and relatively thick walls therebetween. The aforedescribed shape closely approximates the extent of the bending moment and shear force input exerted on the pin by the action of the piston and the connecting rod.

The aforedescribed piston pin is difficult to make using conventional tooling. This is principally due to the double hourglass contoured aperture extending axially therethrough. Resultantly, the expanded diameter midportion of the double hourglass configuration is located between reduced diameter portions and is difficult to access with tools. Applicant has devised a method or process of manufacture which is both economical and efficient. First, a cylindrical slug of high ductility steel is placed in a bore of a die housing and between spaced, movable dies. The dies have tapered end portions adjacent the opposite end faces of the steel slug which are configured so as to form desired bore configurations of one half of a piston pin, i.e., opposite thin-walled end portions and a thicker midportion. The dies are forced toward one another to produce a half pin with thin end portions and a thicker midportion which includes a wall or web extending radially thereacross. Next, a punch is used to strike out the web. Then, two half pins are axially aligned and weld joined together to produce the aforedescribed double hourglass type piston pin. As a final step, the exterior cylindrical surface may be ground or polished, if necessary.

2. There have been attempts to use and produce tapered piston pins in the past. Prior pins known to applicant have included thinner end portions and a thicker midportion, but not the applicant's double hourglass interior configuration as heretofore described. Examples of such tapered pins or the like are found in U.S. Pat. Nos. 3,034,201; 3,314,266 and 4,290,236. All of these prior devices lack the specific characteristics of applicant's piston pin.

In addition to the unique configuration of applicant's piston pin over the devices in the above identified patents, applicant herein discloses a unique method of manufacturing the piston pin. None of the above identified patents disclose a similar method of manufacture.

SUMMARY OF THE INVENTION

The applicant's piston pin and method of manufacture fill a need in modern internal combustion engines for a lightweight, high strength piston pin. The light weight pin reduces inertia to permit the engine to run smoother and at a higher speed, thus increasing the efficiency.

By providing a tubular piston pin with a double hourglass shaped interior aperture, the bending and shear strength of the pin which results from the variable wall thickness, along with its axial length, corresponds closely to the load on the piston pin as imposed by the associated piston and connecting rod.

Applicant's method of manufacturing a tubular pin with a double hourglass shaped interior, does not require special and expensive cutting or grinding tooling. The method described herein utilizes well proven techniques resulting in a low cost and efficient manufacturing procedure.

BRIEF DESCRIPTION OF THE DRAWINGS

FIG. 1 is a perspective view of a metal slug from which a half pin is formed;

FIG. 2 is a partially sectioned view of a die housing and two dies prior to forming the half pin;

FIG. 3 is a view like FIG. 2 after the dies have moved to form the half pin;

FIG. 4 is a sectioned view of the half pin and a punch tool after striking out the midportion web shown in FIG. 3;

FIG. 5 is a sectioned view of two axially aligned half pins being weld joined together to form a single piston pin;

FIG. 6 is view like FIG. 5, but showing a grinding action on the exterior surface of the pin; and FIG. 7 is a sectioned view of an engine cylinder bore, piston, connecting rod and the variable wall thickness piston pin which has a double hourglass shaped interior configuration and includes a typical force curve superimposed thereon.

DETAILED DESCRIPTION OF A PREFERRED EMBODIMENT

An ideal, lightweight but high strength piston pin 10 is shown in FIG. 7. In the drawing, a cross-sectional view of the piston pin 10 is illustrated. Also shown are skirt portions 12 of a piston adjacent bore 14 therein through which the piston pin 10 extends. In FIG. 7, a portion 16 of the engine connecting rod is also shown. It includes a bore 18 through which the pin 10 also extends. The piston and rod 16 are mounted for reciprocal movement in cylinder bore 20 of an associated engine.

Significantly great forces are imposed on the pin 10 by combustion of an air/fuel mixture in an associated engine combustion chamber which would be located above piston 12 in FIG. 7. These forces are transmitted by the pin 10 to the connecting rod 16 and then to the crankshaft of an engine. Resultantly, bending moments and shear forces on the piston pin 10 are produced which vary along its length. The variance of bending moment and shear force on the pin and axially along its length are represented graphically by the force diagram indicia 21. Specifically, the force diagram indicia reveals very little force imposed on pin 10 near its opposite ends and a maximum force between where the piston portions 12 and the connecting rod 16 engage the pin 10 as shown at numerals 22. The force decreases, but is still significant near the midportion of pin 10 as indicated by numeral 23. It should be noted that the axial spacing between piston portions 12 and connecting rod 16 in FIG. 7 are somewhat exaggerated in FIG. 7 for purposes of clarity and explanation.

With the above explanation in mind, it is relatively easy to understand why a lightweight and high strength piston pin should be tubular and should have a variable wall thickness. The ideal pin has a wall thickness which corresponds to the bending moment and shear force input for the particular force characteristics of the associated engine parts including the piston and combustion chamber. Accordingly, the ideal pin 10 has a variable wall thickness with thin end portions 24 corresponding to the lower forces at this axial location. Likewise, the pin 10 has thickened wall portions 26 and a thinner midportion 28 corresponding to the portions 22 and 23 of the force indicia respectively.

It is worthy of comment that the variations in wall thickness of the ideal piston pin 10 may be blended together to form a smooth arcuate interior surface of the pin 10. While this shape may be best from a strength standpoint, it is fairly easy to see that such a curved interior aperture would be extremely difficult to form, particularly the midportion 28 thereof. Technically, such an aperture could be made by grinding, but high cost would preclude the use of such a pin in a mass produced engine.

In view of both of the manufacturing difficulties and of desirable characteristics of the ideal pin, the following description will focus on a relatively low cost process or method of forming a piston pin with a very similar or identical variable wall thickness like the ideal piston pin. In FIG. 1, a slug or cylinder 30 of steel is shown having a diameter equal to the desired outer diameter of the piston pin to be produced. The cylinder 30 should be of a relatively low carbon steel characterized by good ductility, weldability and hardenability. Such qualities are found in SAE 1016 steel although other steels may also be satisfactory.

In FIG. 2, the slug or cylinder 30 is located in a die housing 32 and specifically in a cylindrical bore 34 thereof. The cylindrical surface 35 of the slug 30 is in contact with the wall of bore 34. Positioned at the right in FIG. 2, a die 36 is reciprocally supported in bore 34 adjacent one end surface 38 of cylinder 30. Positioned at the left in FIG. 2, another die 40 is reciprocally supported in bore 34 adjacent an opposite end surface 42 of cylinder 30. Dies 36 and 40 have shaped end portions 44 configured to closely match the shape of the desired internal aperture of the piston pin. The dies 36 and 40 are forcibly moved toward one another in bore 34 as indicated by arrows 46 and 48, respectively.

In FIG. 3, the dies 36 and 40 are positioned after the aforesaid movements in bore 34 and subsequent to shaping of the cylinder 30 into a tubular-like member except for a web or wall 50 formed at a midportion location. Tapered end walls 52 extend axially from the web 50 and in opposite directions to encircle the end portions 44 of dies 36 and 40. The final exial length B (see FIG. 4) of the formed slug 30 is longer than the initial length A (see FIG. 2) of the slug 30.

In FIG. 4, the tubular cylinder 30 is processed to remove the central portion of the web or wall 50 to leave a thickened wall 54 of the now hollow cylinder. Web 50 is removed by a punch tool 56 which is moved in the direction shown by arrow 58. Resultantly, a tubular cylinder is formed having a variable wall thickness along its length. The configuration of the tubular cylinder is intended to correspond to half of the desired configuration of the pin 10 shown in FIG. 7. It can be understood that the size of slug or cylinder 30 in FIG. 1 and the dies 36 and 40 of FIG. 2 are calculated and designed to produce the tubular cylinder of FIG. 4 with a length B which is half the desired length of the desired piston pin.

In FIG. 5, two of the tubular cylinders or half pins which are formed after the process shown in FIG. 4 are axially aligned and weld joined together to form a piston pin of length 2B. Depending on the welding process, internal and external beads 57 and 60, respectively, may be formed inside of and around the cylinder. Specifically, the two cylinders may be welded by an encircling weld head or apparatus 59. The head or apparatus 59 may be of a design to weld by electron beam or by laser. The apparatus 59 may be composed of several parts surrounding the end portions 52, 52' or may be a single unit moved about the end portions. Also, the two cylinders may be joined by friction or inertial welding or by other joining means which produce a sufficiently strong joint. In friction or inertial welding, one of the half pins is rotated apart from the other and then the two are forced together in axial alignment to produce bonding energy by the friction created.

Finally, as shown in FIG. 6, the outer bead 60, if any, may be ground off of the pin by wheel 62 as shown in FIG. 6. The wheel 62 may also be used to finish the entire outer surface of the pin, if desired.

The high strength and lightweight piston pin and the process or method of manufacturing the piston pin set forth above represents a preferred pin and process but slight modifications are contemplated and would still be included in the invention as set forth in the claims that follow.

I claim:

1. A tubular piston pin for an internal combustion engine with a double hourglass configured aperture extending axially therethrough produced by relatively thin-walled end portions and midportion and by relatively thicker-walled portions therebetween, comprising:

a piston pin having a cylindrical exterior surface on which bending load and shear load forces are imposed by portions of an associated piston and a connecting rod whereas the bending and shear forces are greatest at two locations on either side of the midportion and inwardly from either end;

a contoured aperture extending axially through the pin characterized by relatively thin walled end portions and midportion and by relatively thicker-walled portions therebetween whereby the thicker-walled portions are substantially aligned with the increased bending and shear force load on the pin in the areas on either side of the contact between the pin and the associated connecting rod;

the tubular piston pin being composed of two joined half pin portions which are axially aligned and integrally weld joined together.

* * * * *